(No Model.)
E. F. HILL.
SIDE BAR BUGGY.
No. 555,769. Patented Mar. 3, 1896.
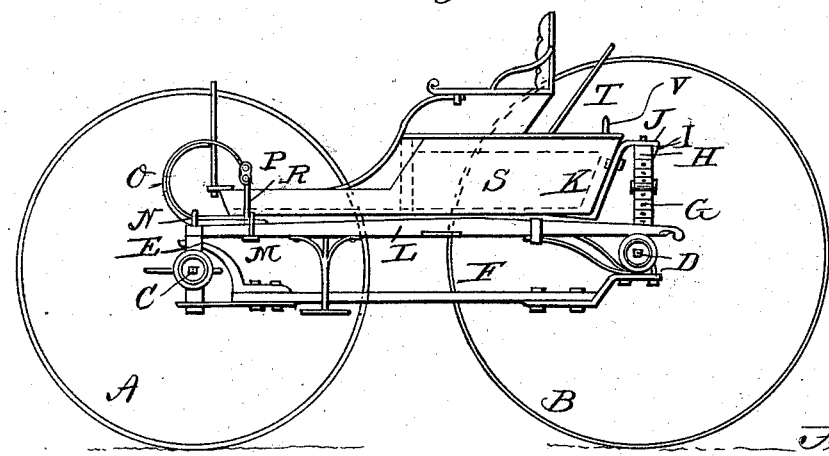
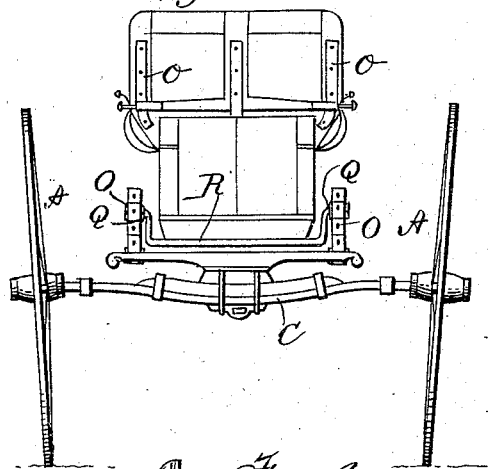
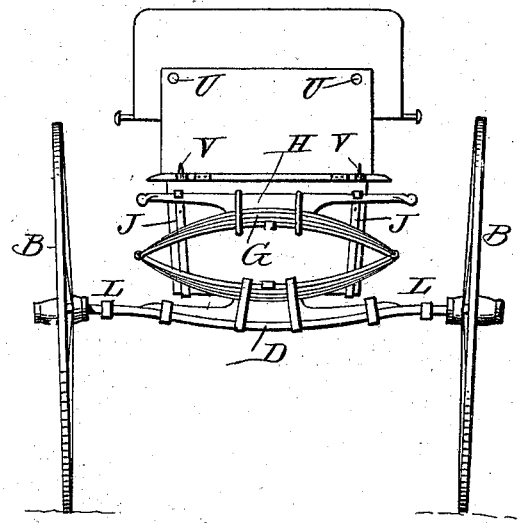
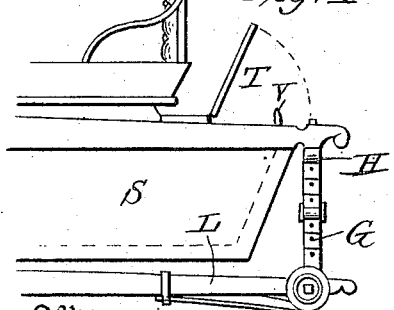
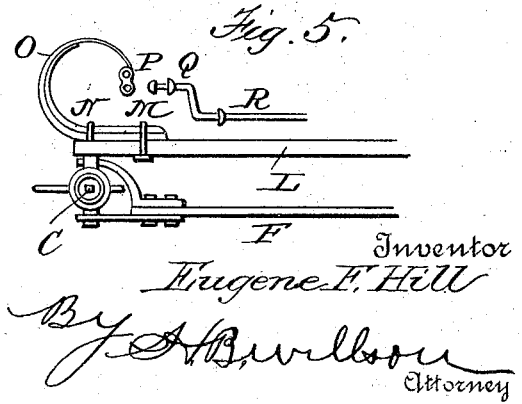
Witnesses
F. L. Durand
A. P. Suit
Inventor
Eugene F. Hill
By J. H. B. Wilson
Attorney

UNITED STATES PATENT OFFICE.

EUGENE F. HILL, OF AUBURN, NEW YORK.

SIDE-BAR BUGGY.

SPECIFICATION forming part of Letters Patent No. 555,769, dated March 3, 1896.

Application filed November 5, 1895. Serial No. 567,987. (No model.)

*To all whom it may concern:*

Be it known that I, EUGENE F. HILL, a citizen of the United States, residing at Auburn, in the county of Cayuga and State of New York, have invented certain new and useful Improvements in Side-Bar Buggies and other Vehicles; and I do declare the following to be a full, clear, and exact description of the invention, such as will enable others skilled in the art to which it appertains to make and use the same.

My invention relates to improvements in side-bar buggies and other vehicles; and its object is to provide an improved construction of the same which shall possess superior advantages when in use.

The invention consists in the novel construction and combination of parts hereinafter fully described and claimed.

In the accompanying drawings, Figure 1 is a side elevation of a vehicle constructed in accordance with my invention. Fig. 2 is a front end view of the same. Fig. 3 is a rear end view. Fig. 4 is a detail elevation of the rear end of the vehicle, and Fig. 5 is a similar view of the front end.

In the said drawings, the reference-letters A and B designate the front and rear wheels respectively, and C and D the front and rear axles, E the bolster, and F the center bar clipped to the rear axle and pivotally connected with the bolster. Clipped to the rear axle is the lower section of an elliptical spring G, the upper section of which is clipped to a cross-bar H. Clamped to this cross-bar near each end is the bent end I of a hanger J, bolted to the corner-post K of the vehicle-body. Clipped to the rear axle are the side bars L, the front ends of which are mortised in the bolster. Secured to the said side bars by clips M and bolts N are curved or C springs O, to the free ends of which are pivoted links P, and journaled to these links are the outwardly-extending ends Q of a bent hanger R, bolted to the front end of the body S. The rear end of this body is formed with a boot, which is closed by a hinged cover T, formed with holes U, through which pass fasteners V when the cover is closed. These fasteners are secured to the wagon-body.

The advantages secured by my invention are ease and comfort to the occupant of the vehicle, simplicity and economy in construction, and durability in use, which will be readily appreciated by those familiar with the art to which the invention pertains.

Having thus fully described my invention, what I claim is—

In a vehicle the combination with the axles, the elliptical spring clipped to the rear axle, and to a cross-bar, the body and the hangers secured to the corner-posts and having their ends clamped to said cross-piece, of the side bars clipped to the rear axle and mortised in the bolster, the C-springs secured thereto, the pivoted links and the bent hanger secured to the wagon-body and having its ends bent outwardly and journaled to said links, substantially as described.

In testimony whereof I affix my signature in presence of two witnesses.

EUGENE F. HILL.

Witnesses:
BRADFORD COOK,
CURTIS R. MYERS.